United States Patent Office 3,142,774
Patented July 28, 1964

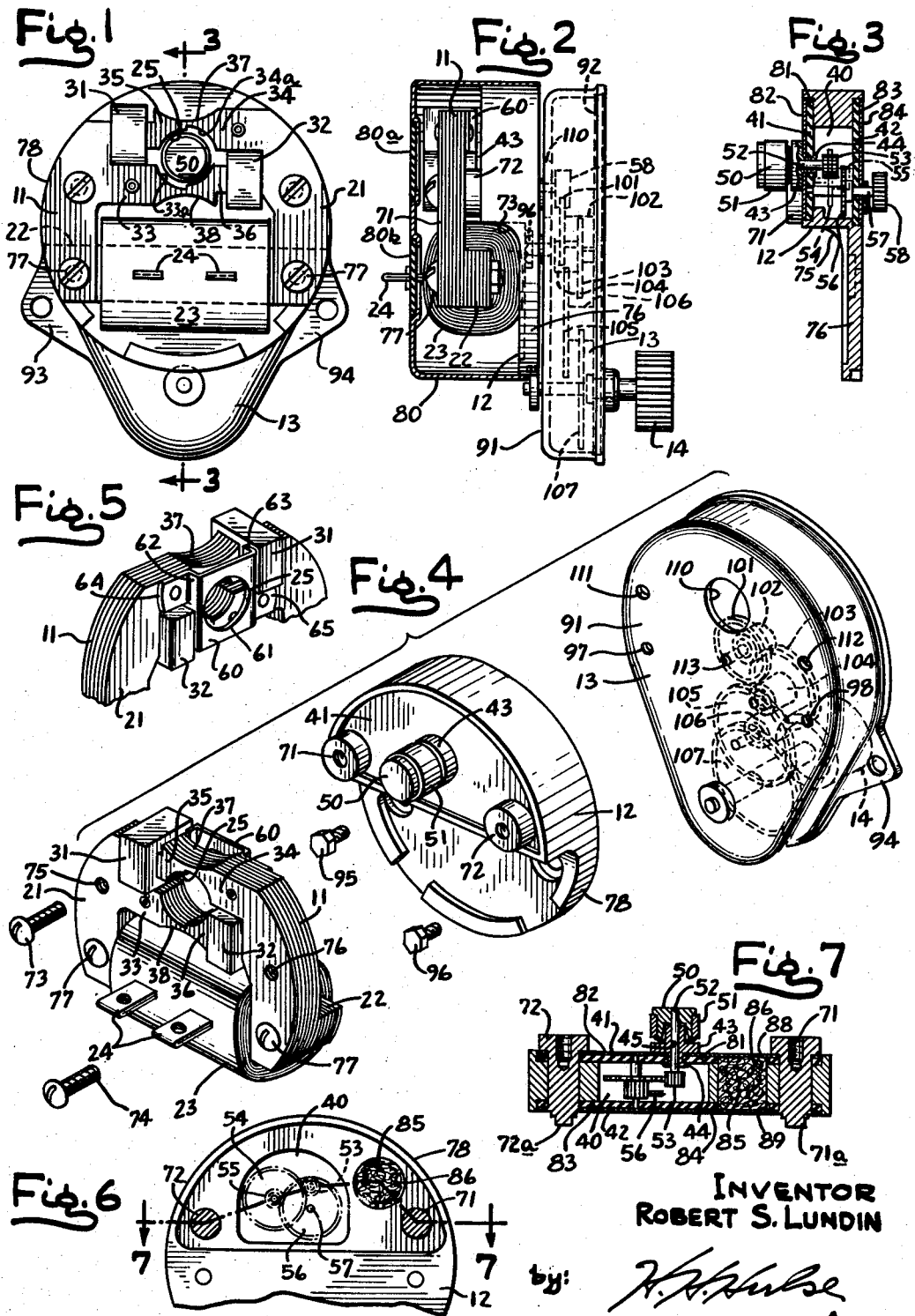

3,142,774
SYNCHRONOUS TIMING MOTOR ASSEMBLY
Robert S. Lundin, Thomaston, Conn., assignor to General Time Corporation, New York, N.Y., a corporation of Delaware
Filed Dec. 22, 1960, Ser. No. 77,658
11 Claims. (Cl. 310—83)

The present invention relates to synchronous timing motor assemblies for use in clocks and other timing devices.

The many uses of synchronous timing devices in the burgeoning automatic control field has made it necessary for those supplying this need to carry extensive inventories of units meeting the various combinations of operating requirements, notably operating voltage and frequency, output speed, output torque, and the size and placement of the output pinion. The only alternative to the carrying of inventory has been the supplying of units on a custom basis which requires a substantial lead time between the placing and filling of the order and which also requires production runs which in many instances involve such a small number of units as to be uneconomical. Moreover the units commonly available in the past have not had the requisite degree of reliability for control purposes, particularly where such units must be used in locations difficult of access within the equipment and where the units must run on a continuous basis. Adequate long time lubrication has been a particularly difficult problem.

Accordingly it is an object of the present invention to provide a synchronous timing motor assembly which is of novel construction, including a number of sub-assemblies which may be standardized and easily and quickly secured together to meet substantially any operating requirement. In this connection it is an object to provide a novel high speed gear train capsule which may be universally used as the center section of the assembly with a motor frame on one side and a low speed gear assembly on the other. It is a related object to provide a timing motor assembly which is highly compact and in which the motor is received in a nested and integrated position in the high speed gear capsule. It is still another object to provide means for insuring that the sub-assemblies are accurately alined with one another incident to putting them together and without exercise of care or attention on the part of the operator, thus enabling complete assemblies to be produced from available sub-assemblies in quantity and on short notice.

It is another object to provide a synchronous timing motor assembly which has novel means for lubricating all of the rotating parts from the rotor to the final output pinion. In this connection it is an object to provide a timing motor assembly in which the high speed gear train and low speed gear train each receive optimum lubrication, with the high speed train being lubriacted by extremely light oil and oil vapor while the low speed gear train is lubricated by heavy lubricant suited to low speed operation. It is a related object to provide a timing assembly capable of a large reduction ratio and in which the high speed gears operate at a high degree of efficiency without any substantial loss due to friction in the lubricant itself. It is another object of the invention to provide a synchronous motor timing assembly which includes two separate gear compartments secured together but having different kinds of lubricant and capable of operating for long periods of time without replenishment.

It is a detailed object of the present invention to provide a synchronous timing motor assembly including a synchronous motor of the shaded pole type and having a novel pole construction so that the shaded flux from each of the poles is offset from the unshaded flux by an angle which approaches 90 degrees thereby to provide a substantially uniform rotating field.

It is also an object to provide a synchronous motor unit and associated high speed gear capsule which is capable of operating reliably over long periods of time and in which the units are so coupled together that the motor is efficiently cooled by the gear capsule and with the warmth from the motor being utilized to insure at least partial vaporization of the oil in the capsule.

Other objects and advantages of the invention will become apparent upon reading the attached detailed description and upon reference to the drawing in which:

FIGURE 1 is a face view of a timing motor assembly constructed in accordance with the present invention, with the motor housing removed to reveal the motor construction.

FIG. 2 is a side elevation of the assembly of FIG. 1 and with the motor housing in section.

FIG. 3 is a vertical section of the gear capsule only, taken along the line 3—3 of FIG. 1.

FIG. 4 is an exploded view, in perspective, showing the three sub-assemblies which make up the complete timing motor assembly.

FIG. 5 is a perspective showing the back of the motor frame including the novel locating bracket.

FIG. 6 is a section taken along the line 6—6 of FIG. 3 showing the internal construction of the high speed gear capsule.

FIG. 7 is a section taken along the line 7—7 in FIG. 6 showing the lubricant path.

While the invention has been described in connection with a preferred embodiment it will be understood that I do not intend to be limited to such embodiment but intend to cover the various modifications and alternative constructions falling within the spirit and scope of the appended claims.

Turning now to the drawings, a synchronous timer motor assembly constructed in accordance with the invention includes a motor unit 11, a high speed gear capsule 12 and a low speed gear box 13 having an output pinion 14. The operation is such that when the motor unit 11 is energized the output pinion 14 rotates at a predetermined slow speed for the driving of clocks and other timing devices.

Turning to the motor construction in greater detail, the motor unit 11 includes a magnetic core 21 formed of a thin stack of flat laminations having a winding bridge 22 secured thereto encircled by a winding 23. Projecting conveniently from the winding 23 are a pair of terminals 24 for connection to the A.-C. supply line. A rotor opening 25 is provided in the core 21. For the purpose of producing a rotating field within the rotor opening 25, one half of the magnetic core material on each side of the opening is surrounded by a shading coil. The shading coils, indicated at 31, 32 respectively, are in the form of closed copper loops of thick cross section defiining unshaded poles 33, 34 and shaded poles 35, 36. As will be understood by one skilled in the art the flux which flows through the shading windings 31, 32 is retarded in phase with respect to the flux in the adjacent, unshaded windings. In accordance with one of the features of the invention, the core material is scalloped out as indicated at 37, 38 to form a progressive diminution of cross sectional area available to the flux defining "bridges" of thin cross section. Because of the low resistance path provided by shading windings 31, 32 and because of the scalloped contour and small cross sectional area of the bridges producing flux saturation, it is found that phase of the flux fed through the shaded poles lags by almost 90 degrees the flux in the adjacent unshaded poles. Moreover the progressive saturation which takes place in the bridges 37, 38 tends to deflect or distribute flux into the rotor over a wide arc. In order to equalize the magnitude of the shaded and unshaded flux, the unshaded poles 33, 34 are radially cut out or relieved as indicated at 33a, 34a thereby introducing an air gap which is effectively in series with the unshaded flux. The net effect is to produce a substantially uniform rotating field for synchronous rotation of the rotor (to be referred to) and with good torque characteristics.

In accordance with the present invention the high speed gear capsule 12 is so constructed as to provide a chamber for the mounting of reduction gears between the opposed walls thereof and with the rotor being journaled in one of the walls for cooperating with the pole structure of the motor unit when the motor unit and gear capsule are secured together. In the present instance the gear capsule 12 is so constructed as to define a chamber 40 having a first wall 41 and a second wall 42. Mounted in the wall 41 is a bearing 43 (FIG. 7) which is preferably staked in place as indicated at 44 and which has a central bore 45. The rotor 50, which is cylindrical in shape, has a rim 51 of permanently magnetizable material and a shaft 52 journaled in the bushing 43. The shaft carries a pinion 53 at its inner end for meshing with the high speed reduction gearing. The reduction gearing includes a first gear 54 which is preferably formed of reinforced phenolic resin and which has a pinion 55 integral therewith. This pinion engages a reduction gear 56 which is also formed of phenolic material. The shaft 57 of the latter projects outwardly through the wall 42 of the chamber terminating in an output pinion 58.

In carrying out the present invention the motor unit is provided with a centering bracket 60 (FIG. 5) having an opening 61 which is centered with respect to the rotor opening 25 in the pole structure and which is dimensioned to snugly engage the periphery of the bushing 43 which supports the rotor. As will be noted in the drawings, the centering bracket 60 is of box-like construction having a face, in which the opening 61 is formed, and having side portions 62, 63 at right angles thereto. Extending outwardly from said side portions and formed integrally therewith are mounting lugs 64, 65 which are riveted in place. It will be apparent, then, that when the motor unit and high speed gear capsule are secured together side-by-side, the rotor 50 projects into the rotor opening 25, and the centering bracket 60 engages the bushing 43 thereby insuring that the rotor is maintained in a precisely centered position. For the purpose of anchoring the motor unit in place, the gear capsule 12 is provided with posts 71, 72 which are tapped and which receive mounting screws 73, 74 passing through openings 75, 76 in the motor pole structure. These have locating tips 71a, 72a.

In accordance with one of the aspects of the present invention the motor unit and high speed gear capsules are so formed as to nest compactly together with close thermal coupling between them, and a source of light vaporizable oil is provided within the chamber 40 of the capsule so that the oil is at least partially vaporized by the warmth from the motor. Thus in the present embodiment the bridge portion 22 of the core is inwardly offset in the direction of the gear capsule and the capsule has a recess formed therein adjacent the chamber 40 for the nested reception of the motor winding. Thus referring to FIG. 2 it will be noted that the gear capsule is of "stepped" cylindrical construction having a recess 75 of arcuate profile which conforms to the profile of the winding and defining a relatively thin plate-like extension 76 which acts as a heat collector. The magnetic bridge 22 over which the coil 23 is telescoped is secured to the core 21 in side-by-side relation, rather than abutting, with the bridge and core being simply connected together by machine screws 77. Since the cylindrical contour of the coil registers with the arcuate surface of the recess 75, with the coil lying closely adjacent the plate-like extension 76, the heat generated in the coil 23 is efficiently transmitted into the gear capsule. Additionally heat is transmitted from the core to the capsule via the posts 71, 72 which interconnect these members. Preferably the portion 76 of the capsule completes a circular outline as indicated in FIG. 1, providing an outer edge 78 over which is fitted a metallic cup 80 which forms a generally cylindrical housing for the combined motor unit and gear capsule. Since the winding is recessed, a "flat" motor profile is achieved, enabling the housing to be of shallow construction.

In order to permit access to the terminals 24 of the winding, insulating insert 80a is provided in the base of the cup, having registering openings formed therein. To give visual indication that the rotor 50 is rotating, a transparent window 80b is provided immediately opposite the end of the rotor 50.

In accordance with one of the aspects of the present invention a lubricant reservoir is provided within the high speed gear capsule together with means for transmitting the lubricant by capillary action to the spindles of the reduction gears. This is accomplished by making the walls 41, 42 of the gear capsule of layered construction and by providing a reservoir in the form of a saturated wick having its ends in contact with the capillary space between the layers. In the present instance the wall 41 is formed of a first or inner layer 81 of phenolic material and an outer layer 82 of shim brass. The wall 42 is formed of corresponding layers 83, 84. The inner layers 81, 83 have openings formed therein serving as bearings for the spindles of the reduction gears, while the outer layers 82, 84 do not have any openings and thus serve to retain the ends of the spindles against endwise movement in addition to effectively sealing against escape of oil vapor from the chamber 40. For the purpose of storing the light oil a wick 85 is provided formed of felt or the like and which is snugly fitted in a cylindrical opening 86 formed in the body of the gear capsule 12. In the present instance the opening 86 in which the wick is received does not have any direct vapor communication with the chamber 40 which contains the reduction gears, the vapor being adequately generated from the oil which is transmitted to the chamber by capillarity. However, it will be apparent to one skilled in the art that direct vapor communication between the chamber and recess 86 may, if desired, be provided. The inner layers 81, 83 are preferably relieved as indicated at 88, 89 so that direct communication is established between the wick 85 and the capillary path, although this is optional.

Once the wick 85 has been saturated with oil and the gears assembled in the positions shown, the walls 41, 42 are permanently secured in position by riveting or the like. Conveniently, the shanks of the posts 71, 72 previously referred to may be extended through the assembly and spun over as indicated at FIG. 7. The net result is to provide a permanently sealed capsule in which light oil is conducted directly to be spindles of the reduction gears and in which the meshing teeth of the high speed gears are constantly bathed in oil vapor thereby to provide highly effective lubrication and minimum wear of the engaged parts. It is found that units constructed as described above may be counted upon to run almost indefinitely without requiring any care or maintenance. Because of the extremely light nature of the oil which is used, there is no viscous drag upon the parts which characterizes the high speed reduction stages used in most commercially available timing mechanisms.

In accordance with one of the aspects of the present invention a low speed gear box is provided which contains the low speed reduction stages providing a ratio which depends upon the customer's requirements and with the gear box completely isolated from the high speed stages and separately lubricated with heavy grease or the like. Thus the low speed gear box 13 in the present instance is formed of a drawn member 91 of flat cup shape having a cover plate 92 which may be soldered in place. A pair of mounting brackets in the form of ears 93, 94 are integrally formed on the member 91 for the purpose of mounting the entire assembly. To secure the low speed gear box to the high speed gear capsule, mounting screws 95, 96 (see FIG. 4) are used which are received in registering openings in the capsule and which are screwed into tapped openings 97, 98 in the gear box.

It will be apparent to one skilled in the art that any desired arrangement of low speed gears may be employed in the gear box 13 to bring about any desired speed reduction. In a practical case where a speed reduction on the order of 16:1 is obtained in the high speed gear capsule, the speed may be further reduced in the gear box by a ratio limited only by the intended use, anywhere from 3½:1 to 270,000:1. In a typical case the gear box 13 may have an input gear 101 carrying a pinion 102, with the latter meshing in turn with a gear 103. Secured to the gear 103 is a pinion 104 driving a gear 105 which is integral with another pinion 106. The latter pinion meshes with an output gear 107 which is on the same shaft as the output pinion 14 previously referred to. In order to couple the output pinion 58 of the gear capsule to the gear box, an opening 110 is provided in the gear box through which the pinion 58 extends when the capsule and gear box are secured together.

For the purpose of automatically providing the desired clearance between the pinion 58 and the input gear 101 in the gear box, locating pins are provided in the back of the capsule and which project into registering holes formed in the gear box. In the present instance the holes in the gear box are indicated at 111, 112. To engage these holes the shanks of the posts 71, 72, which hold the gear capsule together, are extended rearwardly as indicated in FIG. 7. This serves to insure alinement between the two assemblies without any necessity for individual adjustment. The reason for the precise alinement is as follows: The output pinion 58 of the capsule occupies a precise position with respect to the locating pins 71a, 72a since all of the openings in the wall 42 are formed by the same punching operation. Similarly, the receiving holes 111, 112 are formed by the same punching operation in the gear box as forms the spindle opening 113 for the input gear 101. Consequently, fitting the pins 71a, 72a into the holes 111, 112 serves to relatively orient the members (pinion 58 and gear 101) in respect to which they are individually positioned. Thus attaching the gear box to the capsule is simply a matter of getting the pins into the openings and screwing the screws 95, 96 into position. Thereafter the sub-assemblies 12, 13 are integrated to provide the desired overall stepdown between the rotor 50 and the final output pinion 14.

It will be apparent that the above construction permits synchronous timing motor assemblies to be quickly and easily constructed from stock to meet all "customer variable" factors. As stated, it is a simple matter to apply a motor unit having the desired A.-C. voltage and power rating. Knowing the desired speed of the final output pinion it is also a simple matter to choose a low speed gear box which has the desired amount of step down to achieve such output speed. The high speed gear capsules are standard and may be used for all voltages, powers and speeds. Thus the critical component in the system, the high speed gear capsule, since it need not be modified by customer requirements and preferences, may be made economically in a high quality production run using automatic facilities. It takes but a few seconds time to assemble a motor unit on one side of the standard gear capsule and a low speed gear box on the other side, using a total of four machine screws, following which the housing is snapped in place to complete the timing unit. While it is true that a number of different motor units and a number of different low speed gear boxes must be kept in stock in order to satisfy possible customer requirements, nevertheless the total number of different units which need be stocked is substantially reduced, in a practical case to about 60–75 percent of the dollar value of the stock previously required. Service may be greatly speeded.

The two portions of the step down driving train which are isolated from one another each have optimum lubrication; consequently it is not necessary to employ a "compromise" lubricant which is neither well suited to the high speed stages nor to the low speed stages. Because of the novel manner in which the sub-assemblies are integrated the parts are not only efficiently lubricated but a high degree of compactness is achieved, with greater power per unit volume than conventional devices of this type.

While the projecting rotor 50 lies outside of the wall 41, it will be apparent to one skilled in the art that the rotor may be enclosed by a cup-shaped embossment formed of thin non-magnetic material similarly to conventional "enclosed rotors" without departing from the invention.

I claim as my invention:

1. In a synchronous timing motor assembly the combination comprising a motor unit including a generally flat pole structure and a cylindrical winding arranged along one side thereof, a high speed gear capsule, said gear capsule having a thickened portion defining a chamber and a thin mounting portion adjacent thereto defining a recess, a plurality of high speed reduction gears mounted in said chamber and having a rotor projecting therefrom so that when the capsule and motor unit are secured together the rotor cooperates with the pole structure with the winding being nested in the recess, means defining a reservoir of light vaporizable oil in said capsule with means for conducting the oil to the spindles of the reduction gears, said motor unit being in intimate thermal contact with the capsule so that an atmosphere of oil vapor surrounds said gears.

2. In a synchronous timing motor assembly the combination comprising a motor unit including a pole structure and winding, a high speed gear capsule, a low speed gear box, means for securing the motor unit, capsule and gear box together to form a timing unit, said gear capsule defining a substantially sealed chamber with a train of high speed reduction gears mounted therein and having a reservoir of light vaporizable oil so that an atmosphere of oil vapor surrounds said train of high speed gears to provide lubrication with minimum drag, said gear box having a train of low speed, high torque reduction gears mounted therein and coupled to the high speed reduction gears in the capsule when the gear box and capsule are secured together, the low speed reduction gears being lubricated with grease, the gear reduction in the high speed train being sufficiently low so that substantially all customer speed requirements may be met by interchanging the low speed gear box for one of different ratio.

3. In a synchronous timing motor assembly the combination comprising a motor unit including a pole structure and winding, a high speed gear capsule, said gear capsule defining a substantially sealed chamber with a train of high speed reduction gears mounted therein and having a rotor projecting from one side thereof so that the rotor cooperates with the pole structure when the capsule and motor unit are secured together, means defining a reservoir of light vaporizable oil in said capsule for lubricating the spindles and teeth of the reduction gears, said motor being in intimate nested relation with the capsule, a low speed gear box secured to said capsule having a train of low speed, high torque reduction gears mounted therein, said gear train having an input gear and an output gear with the input gear being coupled to the reduction gears in the capsule when the gear box and capsule are secured together, said low speed gear box containing a heavy grease type lubricant for said low speed gears.

4. In a synchronous timing motor assembly the combination comprising a motor unit including a pole structure and winding, a high speed gear capsule, said gear capsule defining a chamber with a train of high speed reduction gears mounted therein and having a rotor projecting from one side thereof so that the rotor cooperates with the pole structure when the capsule and motor unit are secured together, means defining a reservoir of light vaporizable oil in said capsule with means for conducting the oil to the spindles of the reduction gears, said motor being in intimate thermal contact with the capsule and said capsule being sealed so that an atmosphere of oil vapor surrounds said gears, a low speed gear box secured to said capsule having a train of low speed, high torque reduction gears mounted therein, said gear train having an input gear and an output gear with the input gear being coupled to the reduction gears in the capsule when the gear box and capsule are secured together.

5. In a synchronous timing motor assembly the combination comprising a motor unit including a pole structure and winding, a high speed gear capsule, said gear capsule defining a chamber with a train of high speed reduction gears mounted therein and having a rotor projecting from one side thereof so that the rotor cooperates with the pole structure when the capsule and motor unit are secured together, means defining a reservoir of light vaporizable oil in said capsule with means for conducting the oil to the spindles of the reduction gears, a low speed gear box secured to said capsule having a plurality of low speed, high torque reduction gears mounted therein, said capsule having an output pinion projecting therefrom, said gear box having an opening so that the pinion is engaged with one of the reduction gears therein when the gear box and capsule are secured together, and means for registering the capsule and gear box.

6. In a synchronous timing motor assembly the combination comprising a motor unit including a pole structure and winding, a high speed gear capsule having a set of high speed reduction gears, said gear capsule being hollowed out to form a chamber and having opposed walls for mounting the spindles of the reduction gears, a reservoir of light vaporizable oil in said capsule, each wall of the chamber being formed of at least two layers of material arranged face to face and having an interface for capillary conduction of the light oil from the reservoir to the spindles of the gears, a rotor journaled in one of said walls and projecting therefrom so that the rotor cooperates with the pole structure when the motor unit and capsule are secured together, said motor unit being in intimate thermal contact with said capsule, so that an atmosphere of oil vapor surrounds said gears.

7. In a synchronous timing motor assembly the combination comprising a motor unit including a pole structure and winding, a high speed gear capsule having a set of reduction gears, said gear capsule being hollowed out to form a chamber and having opposed walls for mounting the spindles of the reduction gears, each wall being formed of an inner non-metallic layer and an outer metallic arranged face to face and defining between them an interface, said capsule having an oil reservoir formed therein for capillary communication with said interface, the inner layer having bores for journaling the spindles of said gears with the spindles in communication with said interface for lubricating the same, a rotor journaled in one of said walls and projecting therefrom so that the rotor cooperates with the pole structure when the motor unit and capsule are secured together, said motor unit and capsule being in intimate thermal contact so that the temperature of the capsule is raised to a level in a normal environment which causes at least partial vaporization of the oil so that an atmosphere of oil vapor surrounds the gears in the chamber.

8. In a synchronous timing motor assembly the combination comprising a motor unit including a generally flat pole structure and a cylindrical winding arranged along one side thereof, a high speed gear capsule, said gear capsule having a chamber and defining a recess adjacent the chamber, a plurality of high speed reduction gears mounted in said chamber and having a rotor projecting therefrom, said pole structure having a magnetic bridge for supporting the winding with the bridge being offset inwardly from the pole structure so that when the capsule and motor unit are secured together the rotor cooperates with the pole structure and the winding is nested in said recess, means defining a reservoir of light vaporizable oil in said capsule, with means for conducting the oil to the spindles of the reduction gears, said motor unit being in intimate thermal contact with said capsule so that an atmosphere of oil vapor surrounds said gears.

9. In a synchronous timing motor assembly the combination comprising a motor unit including a generally flat pole structure and a cylindrical winding arranged along one side thereof, a high speed gear capsule, said gear capsule being of stepped cylindrical shape with a semi-cylindrical portion thereof being of hollow construction defining a chamber and with the remaining portion being in the form of a flat plate of reduced thickness to define a recess, a plurality of high speed reduction gears mounted in said chamber and having a rotor projecting therefrom so that when the capsule and motor unit are secured together the rotor cooperates with the pole structure with the winding nested in said recess, and a housing in the form of a cup surrounding said motor unit and having its edges telescoped over the outer periphery of said gear capsule, means defining a reservoir of light vaporizable oil in said capsule, with means for conducting the oil to the spindles of the reduction gears, said motor unit being in intimate thermal contact with said capsule so that an atmosphere of oil vapor surrounds said gears.

10. In a synchronous timing motor assembly the combination comprising a motor unit including a flat pole structure and a winding along one side thereof, said pole structure having a circular rotor opening formed therein and shading windings adjacent the opening for the feeding of shaded and unshaded flux, a high speed gear capsule, said gear capsule having a pair of walls defining a chamber having a plurality of reduction gears mounted therein, a rotor journaled in one of said walls and projecting from the capsule, an embossment on said wall coaxial with the rotor, said pole structure having a bracket secured thereto with an opening in the bracket centered with respect to the opening in the pole structure so that when the motor unit is secured to the capsule the bracket telescopes over said embossment for centering of the rotor within the rotor opening, means defining a reservoir of light vaporizable oil in said capsule and said capsule being sealed so that an atmosphere of oil vapor surrounds said reduction gears, said capsule being recessed for nested reception of the coil and to provide intimate thermal coupling between the motor unit and the capsule so that the heat from the motor raises the temperature of the capsule sufficiently to produce partial vaporization of the oil.

11. In a synchronous timing motor assembly the combination comprising a motor unit including a flat pole structure and a winding along one side thereof, said pole structure having a circular rotor opening formed therein and shading windings adjacent the opening for the feeding of shaded and unshaded flux, a high speed gear capsule, said gear capsule having a pair of walls defining a chamber having a plurality of reduction gears mounted therein and having a recess on one side thereof, a bushing in one of said walls and projecting therefrom, a rotor journaled in the bushing, said pole structure having a bracket secured thereto with an opening in the bracket centered with respect to the opening in the pole structure so that when the motor unit is secured to the capsule with the winding in said recess, the bracket telescopes over said bushing for centering of the rotor within the rotor opening, means defining a reservoir of light vaporizable oil in said capsule, and said capsule being sealed so that an atmosphere of oil vapor surrounds said reduction gears.

References Cited in the file of this patent
UNITED STATES PATENTS

| | | |
|---|---|---|
| 1,456,082 | Warren | May 22, 1923 |
| 2,128,142 | Hansen et al. | Aug. 23, 1938 |
| 2,788,455 | Kohlhagen | Apr. 9, 1957 |
| 2,793,307 | Gallagher | May 21, 1957 |
| 2,932,992 | Larsh | Apr. 19, 1960 |
| 2,950,635 | Bieger et al. | Aug. 30, 1960 |